United States Patent [19]
Tominaga et al.

[11] Patent Number: 5,347,700
[45] Date of Patent: Sep. 20, 1994

[54] METHOD OF ASSEMBLING VEHICLE PARTS

[75] Inventors: Osamu Tominaga; Hiroshi Shimanaka, both of Hiroshima, Japan

[73] Assignee: Mazda Motor Corporation, Hiroshima, Japan

[21] Appl. No.: 34,846

[22] Filed: Mar. 19, 1993

[30] Foreign Application Priority Data

Mar. 19, 1992 [JP] Japan .................. 4-063711
Mar. 31, 1992 [JP] Japan .................. 4-018773[U]

[51] Int. Cl.⁵ ............................................. B23P 21/00
[52] U.S. Cl. .................................. 29/430; 228/49.6; 228/101
[58] Field of Search ................. 228/101, 49.8; 29/430

[56] References Cited

U.S. PATENT DOCUMENTS

| | | | |
|---|---|---|---|
| 4,667,866 | 5/1987 | Tobita et al. | 228/49.8 |
| 5,010,634 | 4/1991 | Vemura et al. | 29/430 X |
| 5,143,270 | 9/1992 | Hamada et al. | 29/430 X |

FOREIGN PATENT DOCUMENTS

62-179873 8/1987 Japan .
3-40665 6/1991 Japan .

Primary Examiner—Kenneth J. Ramsey
Attorney, Agent, or Firm—Keck, Mahin & Cate

[57] ABSTRACT

In an automobile parts assembling line, parts pallets carried by a self-running pallet carriage are transferred onto self-running work carriages loaded with fundamental vehicle works of various vehicle models and a specific set of parts on the parts pallet are assembled to a specific model of fundamental work on the primary self-running carriage one after another while the self-running work carriage is self-running along an assembling station. During assembling of the parts, the self-running pallet carriage is returned to a pallet unloading station adjacent to the assembling station and is loaded with an empty parts pallet from the self-running work carriage which continues on carrying the fundamental vehicle work with the specific parts having been assembled thereto.

5 Claims, 7 Drawing Sheets

METHOD OF ASSEMBLING VEHICLE PARTS

BACKGROUND OF THE INVENTION

1. Field of the Invention

This invention relates to a method of assembling parts to a vehicle body and a self-running carriage for carrying a vehicle body on a vehicle assembly line.

2. Description of Related Art

In a typical vehicle assembly line, a fundamental work, such as a chassis frame and an engine to which various parts are assembled, is carried by a self-running carriage along the vehicle assembly line. A plurality of robots, installed along both sides of the vehicle assembly line, perform assembling, such as bolting, riveting and welding, of various parts to the chassis frame placed on the self-running carriage. The parts to be assembled to the chassis frame are collectively stacked on a parts-pallet in close proximity of each robot. A large number of parts-pallets are required, as many as the number of types of parts, and a considerably large space is required in order to arrange these parts-pallets.

In recent years, many different models of vehicles are simultaneously assembled on the same vehicle assembly line. Accordingly, parts, which are different for different models of vehicles, must be placed on separate parts pallets which require even a greater space for disposition. This has resulted in a mass of confusion on both sides of the vehicle assembly line and the difficulty of management of the large number of parts-pallets.

In the automobile assembly line wherein different models of vehicles are jointly assembled, in order to make self-running carriages available to different types of fundamental works, such as chassis frames and engines, from the economic viewpoint, a self-running carriage is provided fitted with a plurality of support stands, three dimensional positions, which are adjustable so as to support portions of fundamental works which are different according to the models of the vehicles being assembled. Conventionally, the adjustment of three dimensional positions of the support stands are accomplished by means of actuators mounted on the self-running carriage. This results in an undesirable increase in the size of the self-running carriage.

SUMMARY OF THE INVENTION

It is therefore an object of the present invention to provide a method of assembling vehicle parts to fundamental works in which there is substantially less need for space on each side of the vehicle assembly line for parts pallet disposition.

It is another object of the present invention to provide a self-running carriage advantageously used in a vehicle assembly line in which there is substantially less need for space on each side of the vehicle assembly line for parts pallet disposition.

It is still another object of the present invention to provide a self-running carriage which can support different types of fundamental works in fixed positions with high accuracy and reliability and which carriage can be formed small in size and light in weight.

The foregoing objects of the present invention are accomplished in an automobile parts assembly line in which different parts are assembled to fundamental works of different models of vehicles. In the assembly line, different sets of parts for different models of vehicles are loaded onto parts pallets, placed on secondary self-running carriages lined up in a row, each of which is transferred onto a primary self-running carriage with a fundamental work of a specific vehicle model preparatorily placed thereon. Then, a specific set of parts loaded on the parts pallet on the primary self-running carriage are assembled to a specific fundamental work on the primary self-running carriage one after another while the primary self-running carriage is self-running on an assembly line. During assembling of the sets of parts to the fundamental works, the secondary self-running carriage with the parts pallet unloaded of parts is returned to the end of assembling line where the parts pallet is unloaded from the primary self-running carriage and is reloaded onto the secondary self-running carriage. Thereafter, the primary self-running carriage is lined up to the rear end of the row of the secondary self-running carriages. After the primary self-running carriage is unloaded with the parts pallet, it is unloaded with the fundamental work to which the parts have been assembled and, then, is returned to the rear end of a row of empty primary self-running carriages for loading of a fundamental work.

The primary self-running carriage has a jig pallet, removably attached to a self-running carriage body, and a plurality of support stands, provided on the jig pallet and independently shiftable in three dimensions, for supporting a fundamental work thereon. Each support stand is shifted in three dimensions by a three dimensional shift means incorporated within the jig pallet so as to be brought in engagement with a specific portion of the fundamental work. The primary self-running carriage further has stay arms, extending from front and rear ends of the self-running carriage body, on which parts pallets for loading parts thereon are placed and supported.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Figure 1:
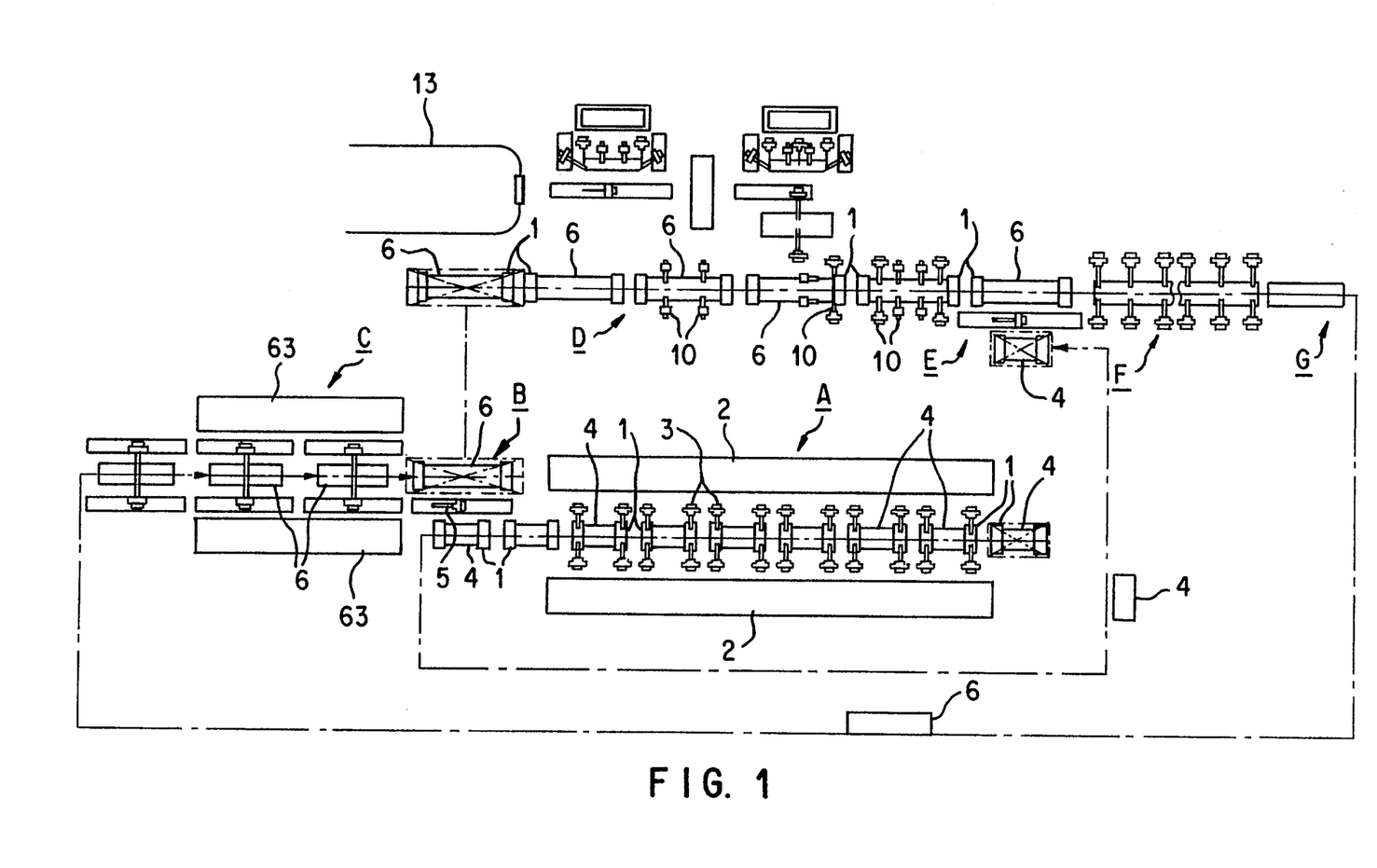
FIG. 1 is a schematic illustration of a vehicle assembly line in which the method of assembling parts to a fundamental work in accordance with a preferred embodiment of the present invention is pracrisized.

Referring to the drawings in detail, and in particular, to FIG. 1, a vehicle assembly line in which vehicle parts are assembled by a method in accordance with a preferred embodiment of the present invention is shown, including a plurality of working stations generally designated by reference characters A–G. At a first working station or loading station A, parts are loaded in on box-shaped parts-pallets 1 carried on a plurality of secondary self-running carriages 4, which are self-propelled by means of wheels attached to the under side of each secondary self-running carriage 4. Carriages 4 run on predetermined courses programmed in a computer, lined up or arranged in a straight row. Specifically, the parts are collectively carried in from the outside of the vehicle assembly line and arranged on loading tables 2, located on opposite sides of the straight row of the secondary self-running carriages 4, by types of parts and vehicle models. Loading robots 3, located beside each loading table 2, load the parts on the loading tables 2 into the parts-pallets 1. The parts-pallets 1 are previously stacked as pairs on the secondary self-running carriages 4. Specifically, while the secondary self-running carriage 4 runs along beside the loading tables 2, selection is made of only parts for the designated parts-pallet 1 on the secondary self-running carriage 4 from among those having been collected and arranged on the loading tables 2.

When the secondary self-running carriage 4 reaches the second working station or pallet transfer station B, the parts-pallets 1 on each secondary self-running carriage 4 are transferred by means of a transfer robot 5 to a primary self-running carriage 6 which has been loaded with a fundamental work, such as a chassis frame W (see FIG. 3) if the vehicle assembly line is a vehicle body assembly line and an engine block if the assembling line is an engine assembly line, and which has been transferred to and located at the pallet transfer station B. The chassis frame W is prepared and is preliminary machined at a third working station or preparatory machining station C adjacent to the pallet transfer station B. The secondary self-running carriage 4, from which the parts-pallets 1 have been unloaded at the pallet transfer station B, is returned to a pallet loading station E which will be described later. The primary self-running carriage 6 is self-propelled by means of wheels attached to the under side of the primary self-running carriage 6 and runs on a predetermined course programmed in a computer. A number of the primary self-running carriages 6 are lined up in a straight row and run separately along a fourth working station or temporarily, preparatory assembling station D in which the parts are temporarily, preparatorily assembled.

Figure 2:
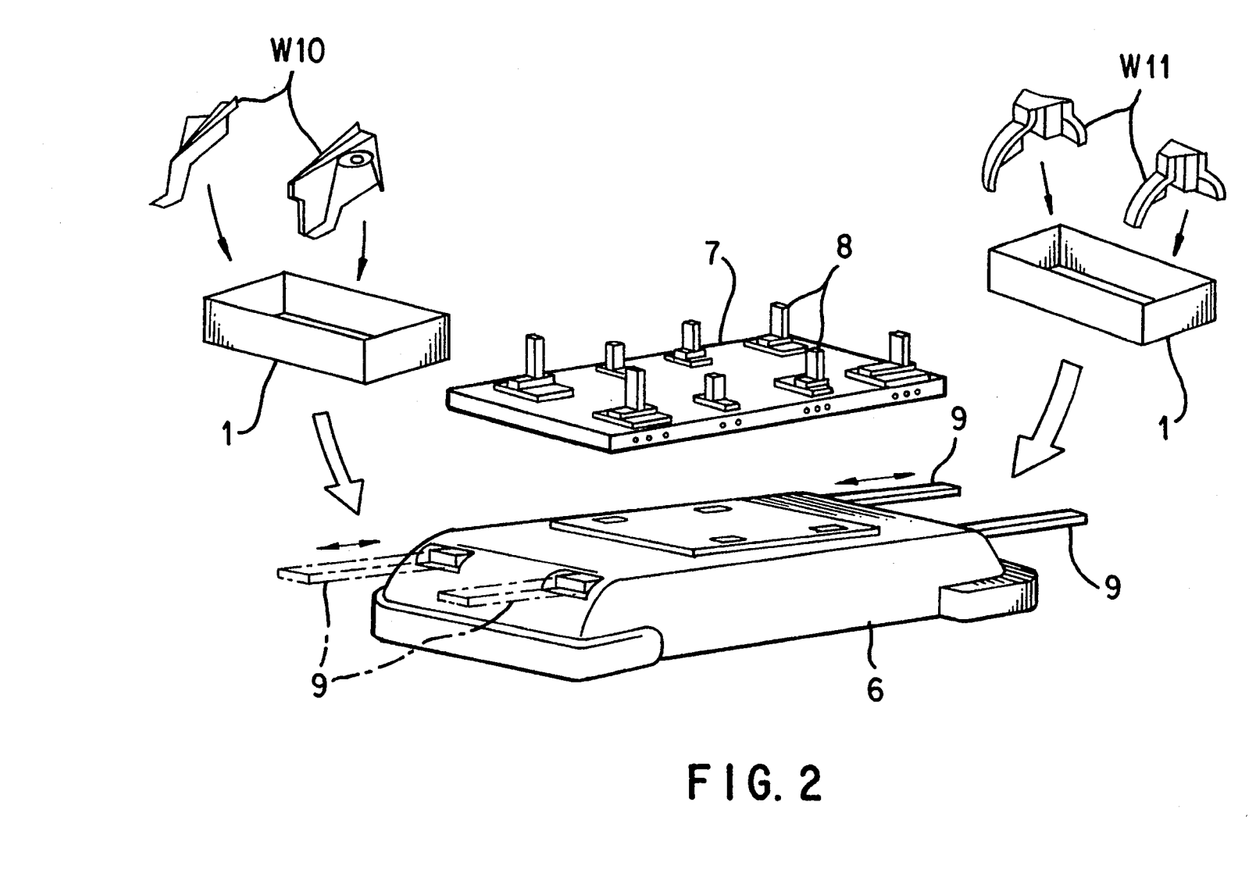
FIG. 2 is an exploded perspective view of a primary self-running carriage used in the vehicle assembly line shown in FIG. 1.

Referring to FIG. 2, the primary self-running carriage 6 is provided with a jig-pallet 7 detachably secured to the top thereof. The jig-pallet 7 is endowed with a plurality of, for instance eight in this instance, support stands 8 for supporting the chassis frame W on their top ends. The primary self-running carriage 6 is further provided with two arms 9, horizontally extending from each of front and rear ends of the primary self-running carriage 6, on which arms 9 there is placed the parts-pallet 1. Each arm 9 is retractable into the primary self-running carriage 6. The parts-pallet 1 placed on the front arms 9 contains only the parts W10 which are assembled to the front portion of the chassis frame W. On the other hand, the parts-pallet 1 placed on the rear arms 9 contains only the parts W11 which are assembled to the rear portion of the chassis frame W.

Referring back to FIG. 1, a number of the primary self-running carriages 6, each of which now carries a pair of the parts-pallets 1, the chassis frame W and the jig pallet 7 thereon, are transferred to the preparatory assembling station D and arranged one after another in a straight line along the preparatory assembling station D. There are installed a plurality of different sets of assembling robots 10 along the preparatory assembling station D. The assembling robots 10 pick up the parts from the parts-pallets 1 on the primary self-running carriages 6, and preparatorily bolt, spot-weld, or otherwise secure, them to the chassis frames W placed on the primary self-running carriages 6. If there are large parts to be assembled to the chassis frames W, such as floor pans, they may be stacked outside the parts-pallets 1, but be transferred into the preparatory assembling station D from a special station outside the vehicle assembly line. For example, floor pans, formed by a press mechanism (not shown) in a press station established separately from the vehicle assembly line, are transferred into the preparatory assembling station D by a hanger line 13, and are then picked out and moved by a robot (not shown) to the preparatory assembling station D, and are preparatorily assembled to the chassis frames W by the robots 10. Along the preparatory assembling station D, the different parts W10 and W11 are preparatorily assembled one after another by the assembling robot 10 to the chassis frames W on the primary self-running carriages 6. When the primary self-running carriage 6 reaches the forward extremity of the preparatory assembling station D, the parts-pallet 1 is emptied.

Subsequently, the primary self-running carriage 6 moves to the fourth working station or pallet transfer station E, wherein the empty secondary self-running carriage 4 has been returned from the pallet transfer station B. At the pallet transfer station E, the empty parts-pallets 1 are transferred from the primary self-running carriage 6 onto the secondary self-running carriage 4. When the secondary self-running carriage 4 is loaded with the empty parts-pallets 1, it runs towards the loading station A and lines up at the end of the straight row of the secondary self-running carriages 4 along the loading tables 2 in order to be loaded with parts W10 and W11.

On the other hand, the primary self-running carriage 6, unloaded with the empty parts-pallets 1, continues on towards the fifth working station or final assembling station E, wherein the parts, which are preparatorily assembled to the chassis frames W, are completely assembled to the chassis frame W as specified. In other words, bolting, spot welding and, otherwise, securing of the parts are accomplished in order to finally assemble them to the chassis frame W. After the final assembly of the parts at the final assemble station E, the primary self-running carriage 6 runs to the sixth station or unloading station Q, wherein the chassis frame W with all of the parts having been completely assembled thereto, is unloaded from the primary self-running carriage 6. The emptied primary self-running carriage 6 runs to and lines up at the end of the row of primary self-running carriages 6 at the preparatory machining station C.

Figure 3:
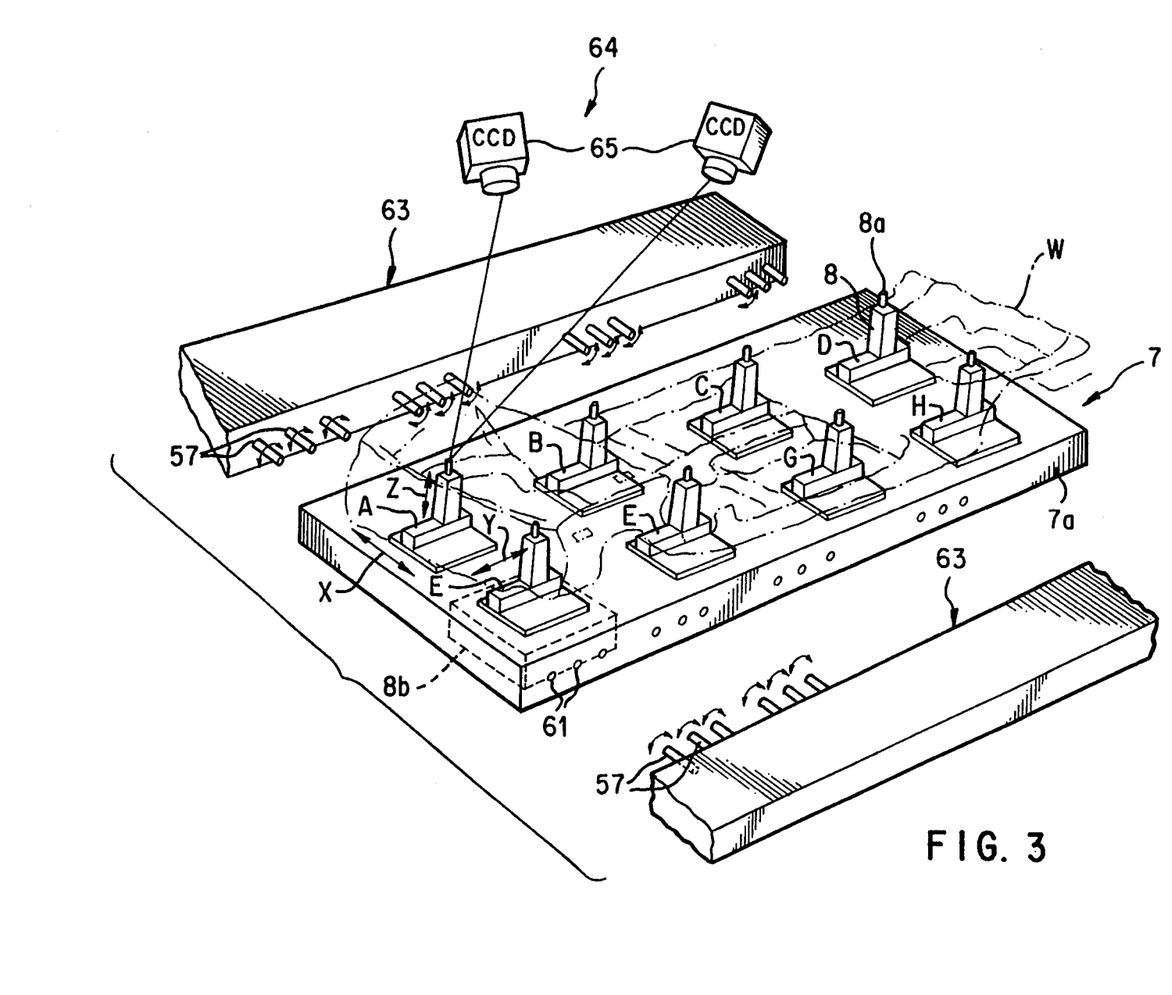
FIG. 3 is a perspective view of a jig pallet in accordance with a preferred embodiment of the present invention.
Figure 4:
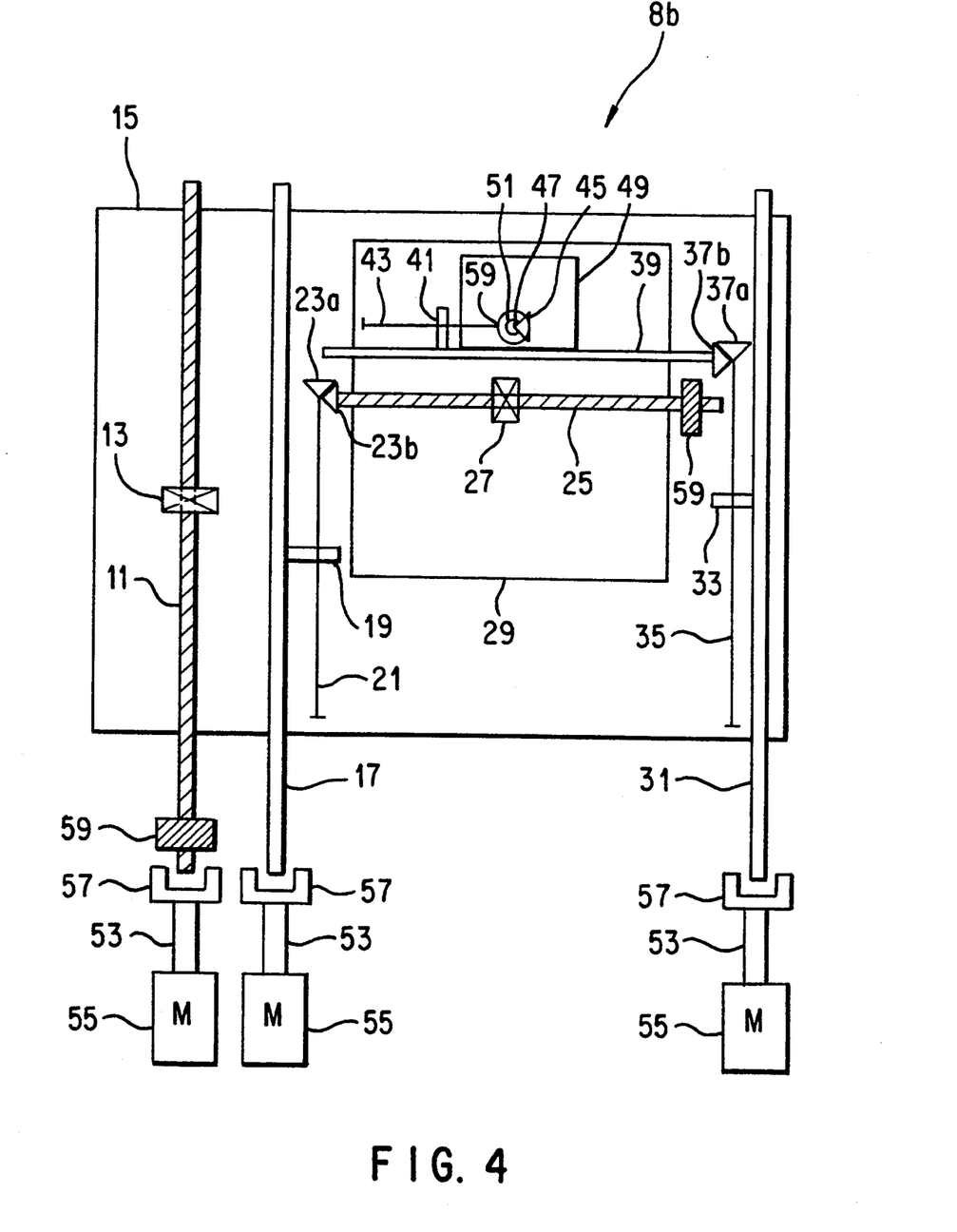
FIG. 4 is a view of a shift mechanism for three dimensional shifting of a support stand of the jig pallet.

Referring to FIGS. 3 and 4 showing the details of the jig-pallet 7, the support stands 8 are provided with generally L-shaped positioning racks A–H, respectively, which are provided at their top with positioning pins 8a, respectively. Each support stand 8 cooperates with and is moved in three directions, namely X, Y and Z directions, by a three-dimensional shift mechanism 8b incorporated inside the jig-pallet 7 so as to fit each positioning pin 8a in a positioning hole formed in the chassis frame W. In this instance, the "X direction" as used herein shall mean and refer to the direction which is transverse to the Y direction in which the primary self-running carriage 6 runs at the preparatory machining station C, and the "Z direction" as used herein shall mean and refer to the vertical direction relative to the jig-pallet 7. The three-dimensional shift mechanism 8a has a lengthwise slidable table (which is referred hereafter to as an X slide table) 15 supported by and movable in the X direction relative to the jig-pallet 7, a transversely slidable table (which is referred hereafter to as a Y slide table) 29 supported by and movable in Y direction relative to the lengthwise slide table 15, and a vertically slidable table (which is referred hereafter to as a Z slide table) 49 supported by and movable in Z direction relative to the transverse slide table 15.

Within the jig-pallet 7 there are provided a set of a screw rod 11 and two spline rods 17 and 31, all of which extend in parallel with one another in the X direction and rotatably supported by the jig-pallet 7, just below each support table 8. One ends of the screw rod 11 and the spline rods 17 and 31 are located adjacent to holes 61 formed in the side wall 7a of the jig-pallet 7. The screw rod 11 engages with a threaded block 13 secured to the underside of the X slide table 15 so that, when it is turned in opposite directions, it moves the X slide table 15 back and forth in the X direction. The spline rod 17 engages with an interim gear 19 fixedly mounted on an interim shaft 21, only schematically shown, which extends in parallel with the spline rod 17 and is rotatably supported by the jig-pallet 7. The interim shaft 29 is provided at its one end with a bevel gear 23a. There is further provided a screw rod 25 extending in the X direction and being supported by the jig-pallet 7. The screw rod 25 is provided at its one end with a bevel gear 23b and engages with a threaded block 27 secured to the under side of the Y slide table 29. That is, when the spline rod 17 is turned in opposite directions, it moves the Y slide table 29 back and forth in the Y direction perpendicular to the X direction. The spline rod 31 engages with an interim gear 33 fixedly mounted on an interim shaft 35, only schematically shown, which extends in parallel with the spline rod 31 and is rotatably supported by the jig-pallet 7. The interim shaft 35 is provided at its one end with a bevel gear 37a. There is further provided an interim spline rod 39 extending in the X direction and being supported by the jig-pallet 7. The interim spline rod 39 is provided at its one end with a bevel gear 37b and is engaged by an interim gear 41 fixedly mounted on an interim shaft 43, only schematically shown, which extends in parallel with the interim spline rod 39 and is rotatably supported by the X slide table 29. The interim shaft 43 is provided at its one end with a bevel gear 45. On the other hand, the Z slide table 49 is provided with a threaded block 51 in engagement with a screw rod 47 which extends vertically, i.e. in the Z direction, and is rotatably supported by the Y slide table 29. The screw rod 47 is engaged by the bevel gear 45. By means of the thus structured mechanism, when the spline rod 31 is turned in opposite directions, it moves the Z slide table 29 up and down in the Z direction perpendicular to the jig-pallet 7. The screw rods 11, 25 and 47 are attached with electromagnetic brakes 59, respectively. These electromagnetic brakes 59 are under energization excepting the motors 55 are being activating.

In the preparatory machining station C, there are jig-positioning units 63 arranged on both sides of a row of the primary self-running carriages 6. Each jig positioning unit 63 has three sets of drive heads, each set of drive heads including three sets of drive motors 55 with extendable shafts 53 and couplers 57 attached to the ends of the extendable shafts 53, as shown in FIG. 4. The extendable shafts 53 are extended so as to insert the couplers 57 through the holes 61 of the side wall 7a of the jig-pallet 7 moved in position at the preparatory machining station C. When the couplers 57 are inserted inside the jig-pallet 7, they operationally couple with the ends of the screw rod 11 and the spline rods 17 and 37 located adjacent to the holes 61, respectively. According to the type of the chassis frame W placed on the primary self-running carriage 6, the motors 55 are actuated so as to adjust the support stands 8 in three dimensions.

The positional adjustment of the support stands 8 is exercised by means of an external position monitor 64 having a pair of monitor cameras, such as charge coupled device (CCD) cameras 65, for gathering three dimensional image information.

Figure 5:
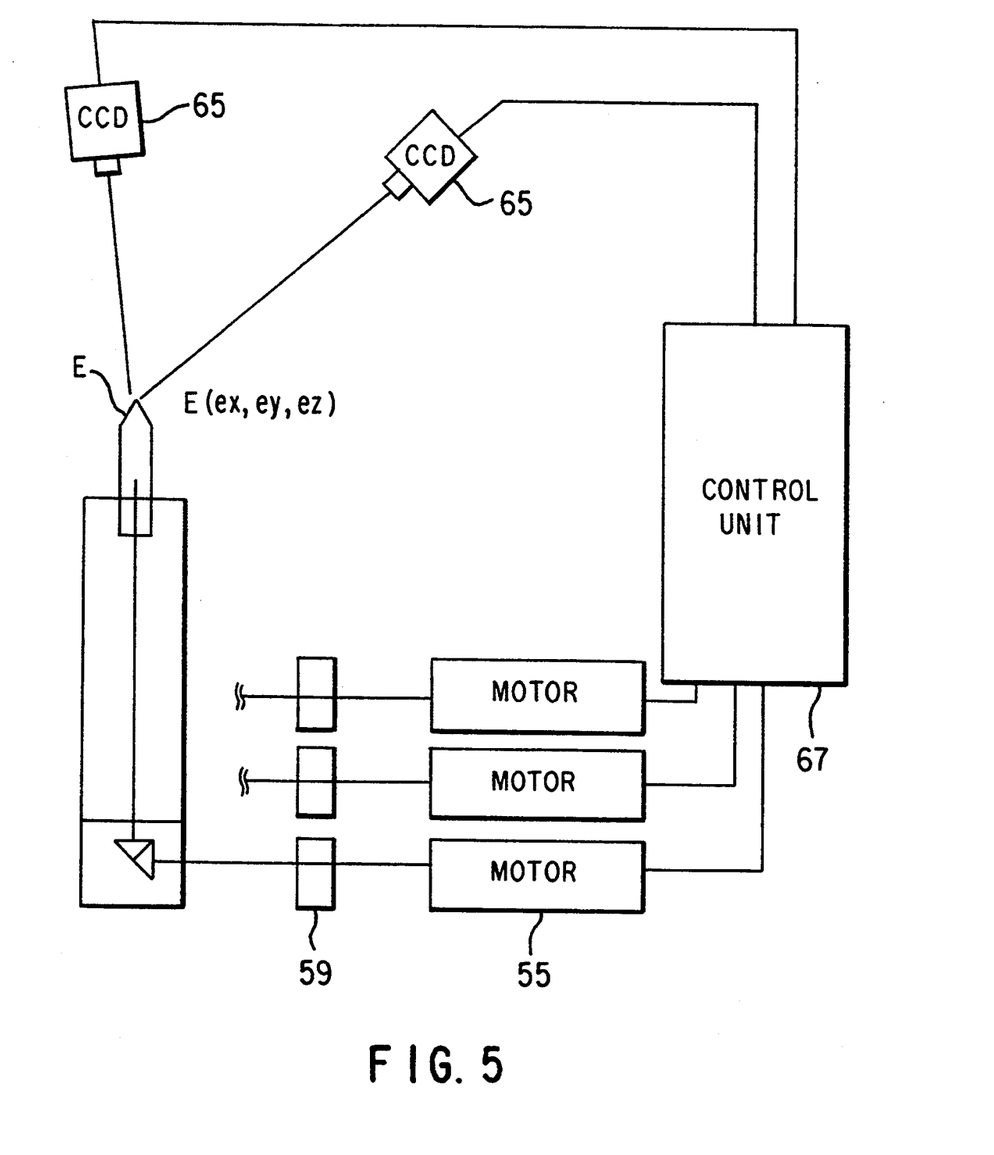
FIG. 5 is a general block diagram of a position adjustment system.

Referring to FIG. 5, the CCD cameras 65 are located to pick up images of the positioning pin 8a at different angles and provides video signals of the images which are translated into three dimensional position information by a control unit 67. This control unit 67 has an internal video signal processor. Various video signal processors are well known in the art, and any known form of signal processor may installed in the control unit 67. From the three dimensional position information, the control unit 67 finds out a positional deviation of an actual position of the positioning pin 8a from the reference position. The particular reference position of course depends upon the type of the particular chassis frame W.

The following description will be directed, by way of example, to the positional adjustment of the positioning rack E of the support stand 8.

Expressing the reference position of the positioning pin 8a of the positioning rack E and an actual position E' as (ex, ey, ez) and (ex+δex, ey+δey, ez+δez), respectively, the positional deviation δE of the positioning pin 8a from the reference position is expressed as follows:

$$\delta E (\delta ex, \delta ey, \delta ez)$$

Then, the motors 55 are actuated so as to move the respective slide tables 15, 29 and 49 by distances δex, δey and δez in the X, Y and Z directions, respectively. The positional adjustment is exercised for all of the positioning pins 8a of the respective positioning racks A to H. If the primary self-running carriage 6 is loaded with a different type of chassis frame W, data of the reference positions of the pins 8a of the respective positioning racks A to H is read in according to the type.

Figure 6:
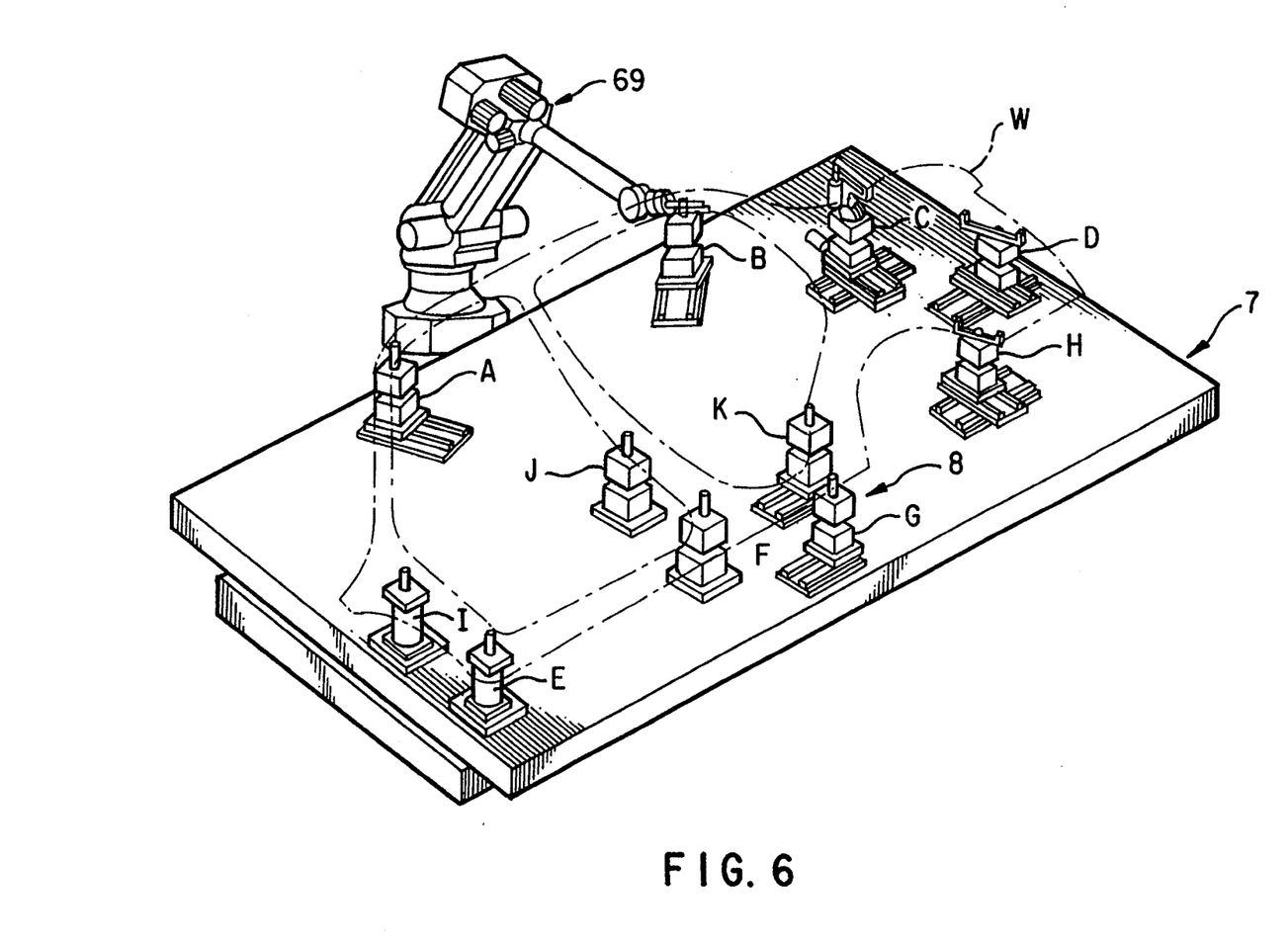
FIG. 6 is a general block diagram of another position adjustment system.

In place of the same number of the jig positioning units 63 as the positioning racks, a single jig positioning robot 69, as shown in FIG. 6, may be utilized. The advantage of utilizing of the single jig positioning robot 69 is displayed in particular when the jig pallet 7 has a plurality of positioning racks A-K arranged not in lengthwise and transverse straight rows and/or when different types of jig pallets which have different numbers and arrangements of positioning racks are mixedly used in the assembling line. It is apparent that the utilization of the single positioning robot 69 eliminates parts of the three-dimensional shift mechanisms 8b excepting the X, Y and Z slide tables 15, 29 and 49 and, accordingly, makes the jig pallet 7 simple in structure.

Figure 7:
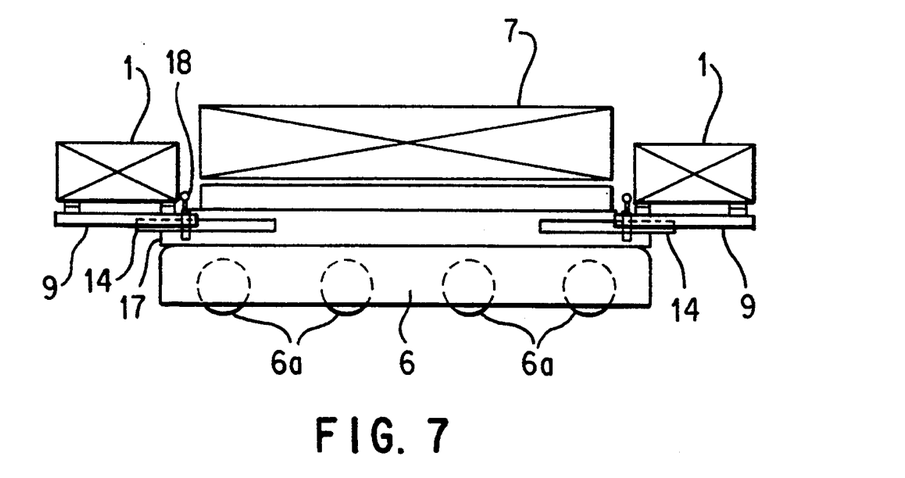
FIG. 7 is a side view of a variation of the primary self-running carriage shown in FIG. 2, in which stay arms are protruded.
Figure 8:
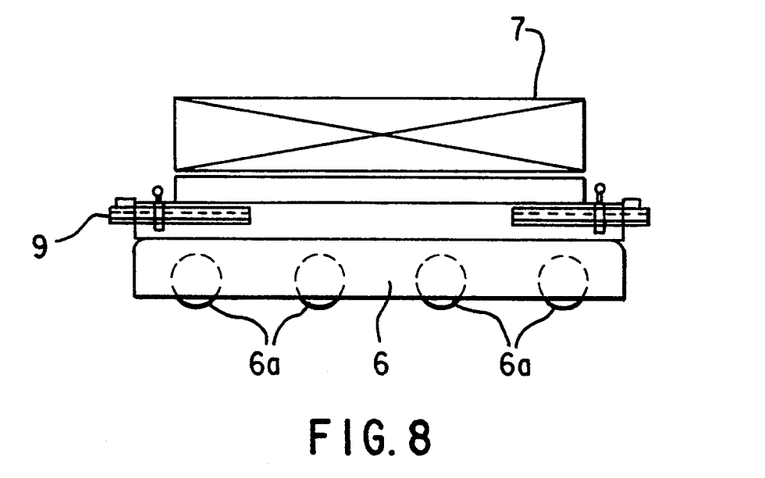
FIG. 8 is a side view of the primary self-running carriage shown in FIG. 7, in which stay arms are retracted.
Figure 9:
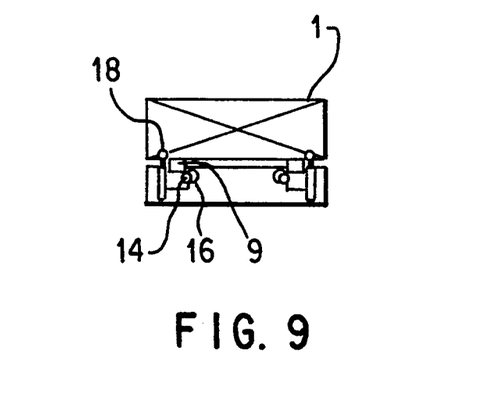
FIG. 9 is a front end view of the primary self-running carriage shown in FIG. 7.

Referring to FIGS. 7 to 9, a variation of the primary self running carriage 6 is shown, in which the retractable arms 9 are different from the primary self running carriage 6 shown in FIG. 2. Front and rear arms 9 are supported by slide guides 14 for back and forth slide movement. These arms 9 are operated by means of sliding cylinders 16. The parts pallet 1 is supported at its one end by the end of the sliding protruding arms 9 and at the other end by body 17 of the primary self running carriage 6. The body 17 is provided with a plate clamp 18 for supporting and clamping a parts pallet 1.

As apparent from the above, the jig-pallet 7 is available to different types of fundamental works, such as chassis frames and engine blocks of different models of vehicles. Furthermore, since the positional adjustment of the positioning racks A to H is made by the jig positioning units 63, including motors 55, provided outside the jig pallet 7, the jig pallets 7 are not only simplified in structure and compacted in overall size but also lightened in weight. In addition, the utilization of the external position monitor 64 eliminates the provision of any internal position detecting device, such as an encoder, in the jig pallet 7, the positional adjustment of positioning racks A to H is performed with a high accuracy even though the screw rods and gears are adversely affected by plays due, for example, to aging or to changes in back rush. In place of a set of the CCD cameras 65 of the position monitor 64, ordinary two dimensional cameras may be used three for each of the positioning racks A to H so as to detect two dimensional deviations in the respective X, Y and Z directions. It is apparently understood that a two dimensional position adjustment is sufficient for each of the positioning racks A to H if a fundamental work is two dimensional.

As described above, according to the method of assembling parts to fundamental vehicle work in accordance with the present invention, since the parts are collectively stacked onto parts pallet 1 carried on the main primary self running carriages 6, there is no need to stack them on both sides of the vehicle assembly line. This permits a reduction in required space and a stream formation of the vehicle assembly line, and, furthermore, simplifies the management of the vehicle assembly line.

The primary self running carriage 6 carries various types of fundamental works by simply changing jig pallets 7 and/or by adjusting the support stands 8 in position, the vehicle assembly line permits many different models of vehicles to be jointly accommodated by the use of the same type of primary self-running carriages. The primary self running carriage 6 can retract its front and rear arms 9 following the completion of preparatory assembling of parts in the preparatory assembling station D, so as to shorten the length of the primary self-running carriage 6 and the overall length of the vehicle assembly line, thereby making the vehicle assembly line more orderly and more manageable. In addition, the self-running carriages utilized in the vehicle assembly line, which carries parts pallets and jig pallets for carrying parts and fundamental works by vehicle types or models, are capable of jointly assembling differing types or models of vehicles.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. An automobile parts assembling method in which different parts are assembled to fundamental works of different models of vehicles, said method comprising the steps of:

loading sets of parts for various vehicle models onto parts pallets placed on secondary self-running carriages lined up in a row, each said secondary self-running carriage being self-running along a parts loading station;

transferring each parts pallet from said secondary self-running carriage onto a primary self-running carriage with a fundamental work of a specific vehicle model placed thereon, for which said set of parts in said each parts pallet are assembled, at a pallet transfer station adjacent to said parts loading station;

assembling a specific said set of parts loaded on said parts pallet on said primary self-running carriage to a specific said fundamental work on said primary self-running carriage one after another while said primary self-running carriage is self-running along an assembling station;

returning said secondary self-running carriage with said parts pallet unloaded to a pallet unloading station adjacent to said assembling station;

unloading said unloaded parts pallet from said primary self-running carriage and reloading it onto said secondary self-running carriage at said pallet unloading station; and returning said primary self-running carriage to said pallet transfer station after unloading said fundamental work with said set of parts assembled thereto.

2. An automobile parts assembling method as defined in claim 1, and further comprising the step of returning said secondary self-running carriage onto which said parts pallet has been reloaded at said pallet unloading station to the rear extremity of said row of secondary self-running carriages.

3. An automobile parts assembling method as defined in claim 2, and further comprising the step of preparatory machining said fundamental work placed on said primary self-running carriage at a preparatory machining station adjacent to said pallet transfer station opposite to said parts loading station.

4. An automobile parts assembling method as defined in claim 1, wherein said fundamental work is a chassis frame of a vehicle body.

5. An automobile parts assembling method as defined in claim 1, wherein said fundamental work is an engine block.

* * * * *